United States Patent [19]

Benson et al.

[11] 4,071,876

[45] Jan. 31, 1978

[54] PLUGGABLE PROTECTOR HOLDER FOR SURGE ARRESTOR GAS TUBES

[75] Inventors: Wayne J. Benson, Belmont; Roy B. Torburn, Palo Alto; Donald G. Tweed, Mountain View, all of Calif.

[73] Assignee: GTE Automatic Electric Laboratories Incorporated, Northlake, Ill.

[21] Appl. No.: 751,637

[22] Filed: Dec. 17, 1976

[51] Int. Cl.[2] .............................................. H02H 7/20

[52] U.S. Cl. .................................. 361/119; 361/120; 339/111; 361/331

[58] Field of Search ............... 361/119, 118, 120, 117, 361/352, 394, 399, 400, 401, 414, 422, 331; 339/14 P, 14 R, 75 A, 75 MP, 111, 176 MP, 192 R

[56] References Cited

U.S. PATENT DOCUMENTS

| | | | |
|---|---|---|---|
| 3,660,803 | 5/1972 | Cooney | 339/176 MP |
| 3,947,729 | 3/1976 | Tesch | 361/119 |
| 3,961,226 | 6/1976 | Hoffman et al. | 361/119 |

*Primary Examiner*—Donovan F. Duggan
*Assistant Examiner*—Patrick R. Salce
*Attorney, Agent, or Firm*—Russell A. Cannon; Leonard R. Cool

[57] ABSTRACT

This protector holder includes a plurality of double ended spring terminals which are arranged in a row in a housing that is made up of mating body halves. Each spring terminal includes a folded ribbon contact and adjacent-facing folded finger contacts formed on opposite ends thereof which are connected together by a shank. Each body half has a plurality of openings arranged in a row in one side thereof, each opening having a slot extending through the top wall and one side of the body half and having a trough in the one side of the latter body half which extends through the bottom wall thereof. The finger contacts and shanks of spring terminals are located in associated openings and slots, respectively, with the folded ribbon contacts extending above the top wall of a body half in pairs which face each other. A pair of body halves mate such that the slots and openings form slotted compartments in a housing which hold the shanks and finger contacts of the terminals in place. The troughs in the two body halves also mate to form openings through which the holder is plugged onto pins of a connector, with the pins engaging associated finger contacts inside the compartments. A ground strap having fingers extending above the top wall of the housing and between ribbon contacts of pairs of terminals extends around the side and ends of the housing. Cylindrical gas tube type surge arrestors having end and intermediate band electrodes are pressed between associated facing folded ribbon contacts with fingers of the ground strap contacting associated intermediate band electrodes.

10 Claims, 7 Drawing Figures

PLUGGABLE PROTECTOR HOLDER FOR SURGE ARRESTOR GAS TUBES

BACKGROUND OF INVENTION

This invention relates to protectors and more particularly to improved apparatus providing high voltage protection for telephone repeaters that are connected across telephone line cable pairs at connectors in a repeater housing.

Repeaters are inserted at intermediate points in telephone cables, for example, to amplify signals in order to compensate for losses incurred in transmission over cable. It is desirable to protect electrical components in the repeater unit from surge voltages which may be induced on pairs of wires in the cable by lightning or power lines. This is accomplished by connecting gas tube type surge arrestors across the repeater unit and associated cable pairs where they are connected together. When a surge voltage is induced on a cable pair, a gas tube breaks down and conducts to short circuit the input or output of the repeater and the cable pair. In the prior-art, a multipin connector is mounted in a repeater housing and sockets of an associated repeater unit are plugged onto pins of the former. A plurality of other connectors, each having a plurality of sockets for associated pins on an associated protector module which includes gas tubes, are also mounted on the repeater housing. Hand wiring and hand soldering of interconnecting wires is required between cable pairs and the other connectors, as well as between the multipin connector and the other connectors. Additional hand wiring and hand soldering of interconnecting wires is required on individual protector modules between pins thereof and associated snap fasteners making electrical connection to band electrodes of the gas tubes. In an alternate prior art approach employing gas tubes having three pin-type electrodes, a protector holder having sockets for each gas tube and associated connector pins is secured to the repeater housing by screws. The holder comprises a dielectric body having a plurality of slotted sleeve sockets therein which are arranged in groups of three with their axes in a first plane, and a plurality of pins which are parallel to each other in a second plane that is parallel to the first plane. The intermediate socket of each group is connected to a ground plate on the back of the body. One ends of the pins are bent over and connected to associated ones of the other sockets inside the body. After this dielectric body is attached to a panel in the repeater housing, it is necessary to connect wires between the pins thereon and pins of the multipin connector which connects to the repeater unit itself. It is desirable to reduce the amount of manual labor required, which is expensive, as well as the possibility of wiring errors and broken wires, and the amount of space required to provide such protection for repeater units.

An object of this invention is the provision of an improved protector module holder for receiving plug-in type gas tube surge arrestors and which is pluggable directly onto pins of a multipin connector in a repeater housing.

DESCRIPTION OF PREFERRED EMBODIMENTS

Figure 1:
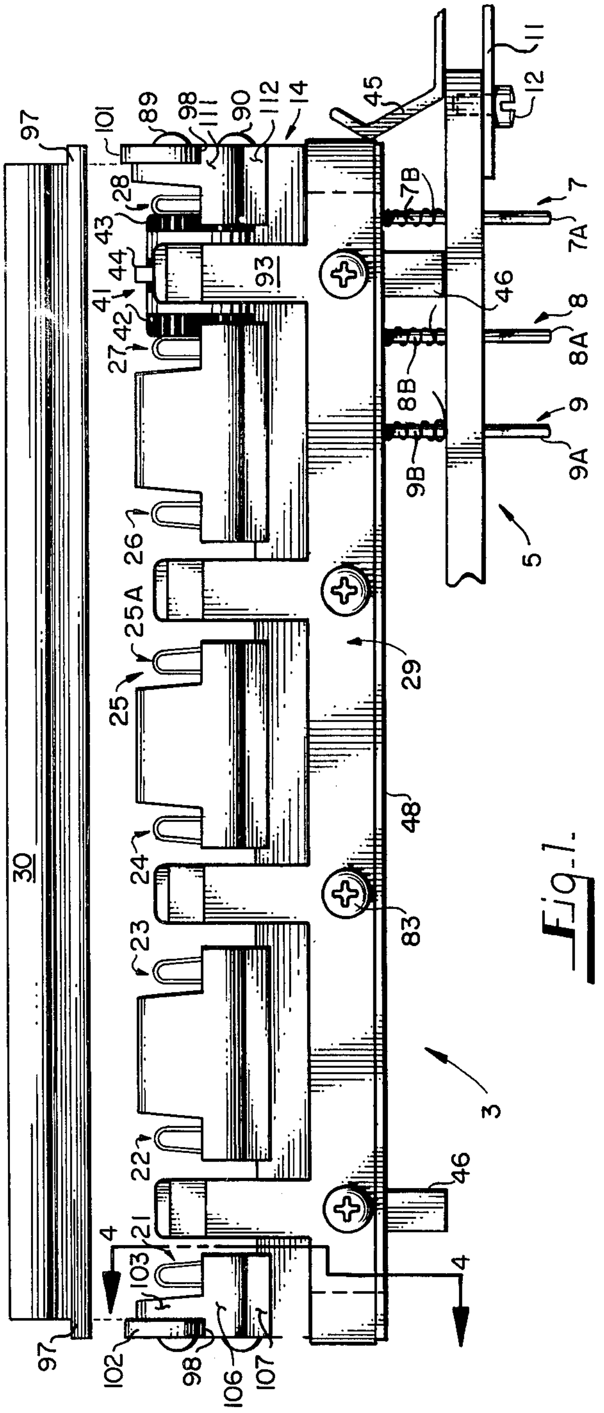
FIG. 1 is a front elevation view of a gas tube holder 3 embodying this invention, together with a portion of an associated repeater connector 5 in a repeater housing, a cover 30 for the holder 3 being shown above the latter.
Figure 2:
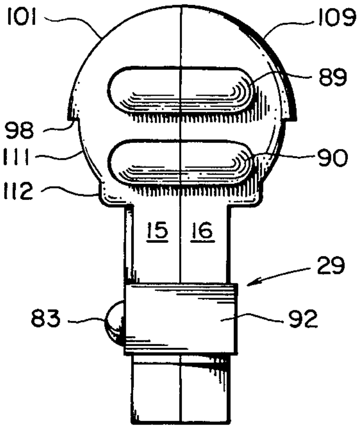
FIG. 2 is a side view of the holder 3 in FIG. 1.

Referring now to the drawings, a protector module holder 3 embodying this invention is shown in FIG. 1 in conjunction with a portion of a multipin connector 5 which includes a plurality of pins 7, 8, and 9, and which is mounted on a rear panel 11 of a repeater housing (not shown) such as by screws 12. The protector holder 3 comprises a dielectric housing 14 which is made up of a pair of body halves 15 and 16 (see FIG. 2), a plurality of spring terminals 21-28 which are identical, a ground strap 29, and a dielectric cover 30. Each spring terminal 26, for example, has a folded ribbon contact 26A formed on the one end thereof which is located above the top of the body halves 15 and 16 and an adjacent-facing folded finger contact 26B formed on the other end thereof which is located in a compartment 36' within the housing 14 (see FIG. 3). The holder 3 is designed to operate in conjunction with cylindrical gas tube type surge arrestors such as the one tube 41 shown in FIGS. 1 and 3. This gas tube surge arrestor 41 has electrically conductive end cap and ring electrodes 42 and 43 at opposite ends thereof, and has an intermediate cylindrical ring electrode 44 for connection to a ground reference potential. In practice, gas tube surge arrestors are pressed into the holder between associated pairs of facing folded ribbon contacts, only the one tube 41 being shown in FIGS. 1 and 3 for convenience of illustration.

A repeater unit (not shown) is plugged onto the one ends 7A, 8A, and 9A of the pins 7-9 which are unobstructed and free of any external wiring. Wire wrap connections of cable pair wires, for example, are made to only the other ends 7B, 8B and 9B of the pins. One wire wrap connection is made on these other ends of each pin. A second wire wrap connection is made on the other end of every third pin such as the pin 9 which is also connected to ground. This is the only hand wiring required for the protectors in a repeater housing in order to use a protector holder 3 embodying this invention. The holder 3 plugs onto the portions of the other ends of the pins 7, 8 and 9 that extend beyond the wire wrap (see FIG. 3) in order to connect gas tube type surge arrestors across associated cable pairs and the strap 29 on the holder to a contact 45 in the repeater housing which is connected to the ground reference potential. The standoffs 46 and 47 on the bottoms 48 of the body halves keep the housing spaced away from the wire wrap in order to protect the latter.

Figure 3:
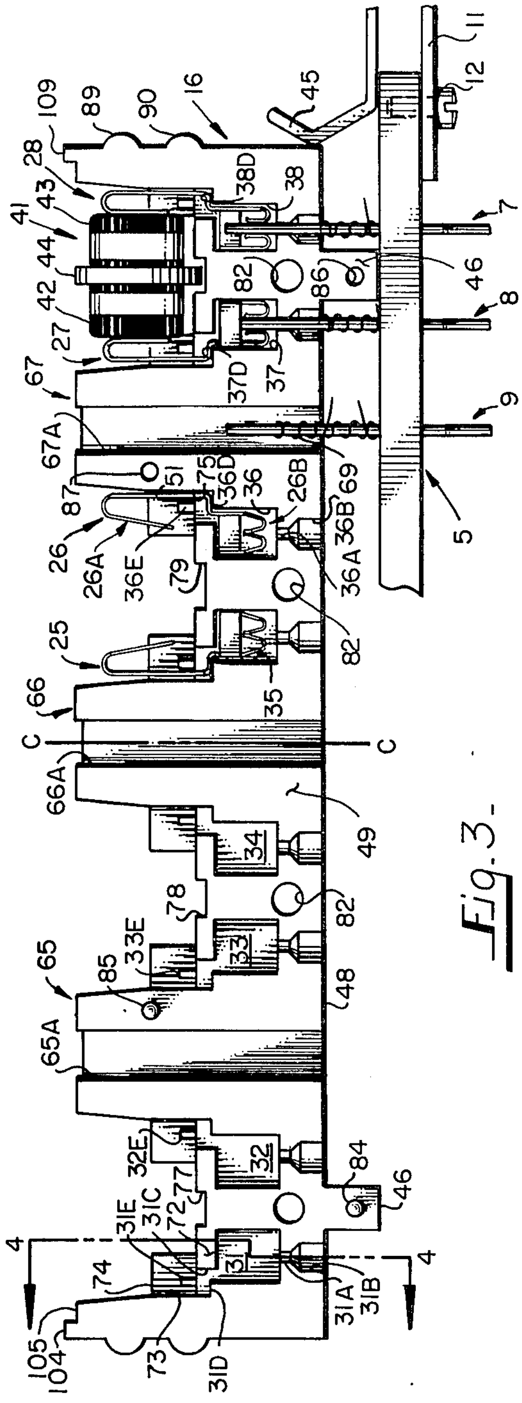
FIG. 3 is a front elevation view of the rear body half 16 of the gas tube holder 3, and associated repeater connector 5 in FIG. 1, with the ground strap 29 and the clips 21-23 being removed therefrom.
Figure 6:
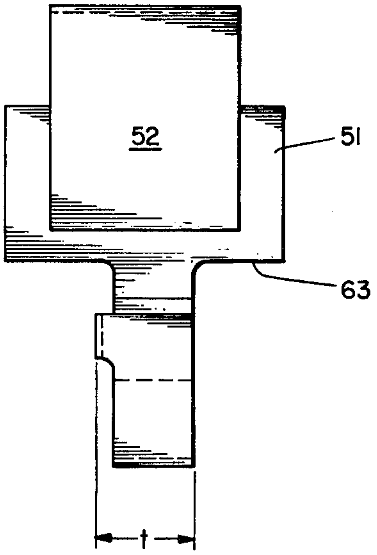
FIG. 6 is an enlarge front elevation view of the clip terminal 26 looking in the direction opposite to that of the arrows 4—4.
Figure 5:
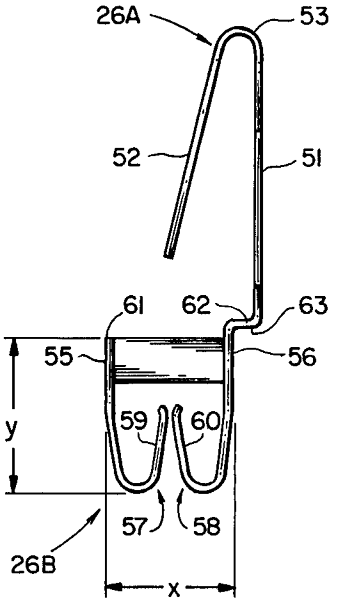
FIG. 5 is an enlarged side elevation view of the clip terminal 26.

The two body halves 15 and 16 of a housing 3 are preferably identical, the inner-one side 49 of the body half 16 being shown in FIG. 3 with several spring terminals 25-28 associated therewith. All of the spring terminals 21-28 in FIGS. 1 and 3 are identical. The terminal 26 is therefore representative and is illustrated in the front and side views thereof in FIGS. 5 and 6. The upper portion of terminal 26 is formed into a folded ribbon contact 26A consisting of an upright side member 51 having a movable arm 52 cantilevered from the top edge 53 thereof. The lower portion of the terminal 26 is formed into a folded finger contact 26B consisting of a conductive strip bent to form parallel spaced apart front and back walls 55 and 56 having associated ribbon contacts 57 and 58 depending from the bottom edges thereof with cantilevered sides 59 and 60 of the latter contacts and the free ends thereof being adjacent to each other. The upper and lower portions of the terminal are connected through a horizontal shank 62 having a lower edge or shoulder 63. The terminals such as terminal 26 may be stamped from a sheet of beryllium copper, bent to the configuration illustrated in FIGS. 5 and 6, and heat treated to produce a spring force in the three cantilevered arms thereof. The width of the central portion of the side 51 is selected to be greater than that of the cantilevered side 52 and the top portion of the former for providing additional support in the housing as is described more fully hereinafter.

The body half 16 is symmetrical with respect to the center line C—C thereof as is shown in FIG. 3. A plurality of rectangularly shaped openings 31 - 38, which are arranged in pairs, are formed in the one side 49. The pairs of openings are spaced apart by associated dielectric upright members 65, 66 and 67. Since all of the openings 31 - 38 are substantially the same, a description of the opening 31 at the left in FIG. 3 also relates to the other openings 32-38 there. In order to receive the folded finger contact 21B of the terminal 21, the width and height of the opening 31 in FIG. 3 are slightly greater than the dimensions $x$ and $y$ of FIG. 5. Also, the depth of the hole 31 is slightly greater than one half the dimension $t$ in FIG. 6. A counter sunk groove 31A in the side 49 extends through the bottom 48 of the body half 16 and into the center of the opening 31. The depths of the inner groove 31A and the counter sink 31B are slightly greater than and much greater than one half the width of the pins on connector 5. A slot 31C in the top wall 72 extends into the hole 31 and preferably extends over the breadth of this hole. The wall 73 of the body half 16 adjacent the slot 31C is recessed to form a shoulder 31D which extends into this slot. A ridge 31E extends from the inside surface of the wall 74 toward a plane containing the side 49 of the body half 16 and above the slot 31C. The lower portion of a terminal 26, for example, fits into the associated opening 36 with the lower surface 63 of the terminal resting on shoulder 36D of the body half, the upper portion 51 of the terminal being located between the ridge 36E and the adjacent vertical wall 75 to hold the terminal 26 in place. The opening between the fingers 57 and 58 of terminal 26 is then aligned with grooves 36A and 36B.

The body half 16 has troughs 65A, 66A and 67A formed in associated upright members 65, 66 and 67 that are parallel to the center line C—C and have a depth which is slightly greater than one half the thickness of the second wire wrap 69 on the pin 9 of connector 5. Transverse troughs 77 - 80 are also formed in the top wall 72 of body half 16 intermediate adjacent ridges such as the ones 31E and 32E and having a depth sufficient for receiving the intermediate ring electrode 44 on a gas tube surge arrestor such as the tube 41 shown on the right side of FIG. 3. A plurality of threaded holes 82 are symmetrically located on and formed in side 49 for receiving screws 83 (see FIG. 1) which hold the two body halves 15 and 16 and the ground strap 29 together. Alternatively, the screws 83 could extend through the two body halves 15 and 16 and into a nut (not shown). A pair of alignment pins 84 and 85 are precisely located on the sides of an associated standoff post 47 and the upright member 65. Corresponding alignment holes 86 and 87 are also precisely located on and formed in the sides of an associated standoff post 47 and the upright member 67. A pair of transverse elongated beads 89 and 90 are formed on the ends of the body halves to facilitate pulling a protector holder 3 away from pins of a connector 5.

Figure 7:
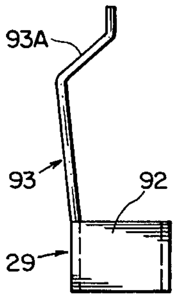
FIG. 7 is a side elevation view of the ground strap 29.

When the folded finger contacts of spring terminals are located in associated openings of a body half 16, the other body half 15 is placed next to it. The pins 84 and 85 on each body half fit into corresponding holes 86 and 87 in the other body half to facilitate alignment of associated ones of the holes 31-38, grooves 31A - 38A and 31B-38B, slots 31D - 38D, ridges 31E-38E, troughs 77-80, and troughs 65A-67A in the two body halves. By way of example, when body halves 15 and 16 are joined together in this manner the hole 36 in the body half 16 will be aligned with a hole 33 on the other body half 15 to form the compartment 36' containing the folded finger contact 26B of spring terminal 26 and having a slot extending across the full width of the compartment. A ground strap 29, having ends thereof which are bent in a U shaped pattern to fit around the ends of the two body halves, is then slipped over the latter and secured thereto by screws 83. Spring fingers 93 on the ground strap are spaced apart such that they are aligned with associated ones of the troughs 77 - 80 in an assembled connector. The ends 93A of the fingers (see FIG. 7) are bent toward the connector body 3 so as to contact intermediate ring electrodes 44 on gas tubes such as the one 41 in holder 3 to facilitate connection thereof to the ground reference potential.

The cylindrical openings formed by the grooves, such as grooves 31A, 31B and 38A, 38B in a holder 3, are aligned with pins of a connector 5 and pressed onto the latter. The elongated opening formed by the troughs 67A and 65A for example, provides an opening that is large enough to receive the second wire wrap 69 on pin 9 to prevent it being damaged. The standoff posts 47 prevent the bottom 48 of the holder from contacting wire wrap connections on other pins and damaging them. When the finger contacts 21B-28B of the terminals in the holder 3 are pressed onto associated pins of a connector 5, the top edges 61 of the terminals contact the top walls of associated compartments to hold them in place. When a gas tube 41 is pressed between the sides 52 of the terminals 27 and 28, for example, the shoulders 37D and 38D in the part 16 limit movement of these terminals, as they also do when the holder 3 is pulled away from the pins 7-9. The dielectric cover 30 in FIG. 1 may be snapped onto the top of holder 3 to prevent anyone touching the terminals. The cover is held in place by the protrusions 97 and associated shoulders 98 on the housing.

Figure 4:
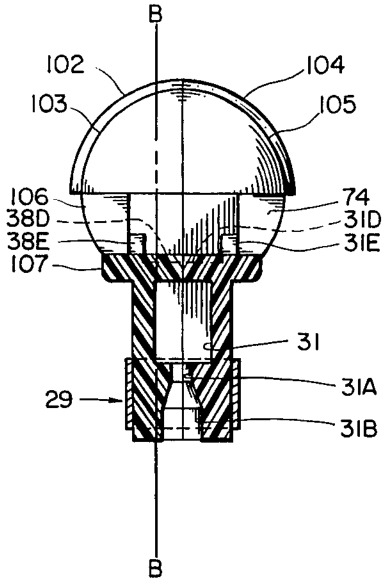
FIG. 4 is a section view of the holder 3 in FIG. 1 taken along lines 4—4.

Although this invention is described in detail in relation to preferred embodiments thereof, variations and modifications of this structure will occur to those skilled in the art without departing from the spirit of this invention. By way of example, the spring terminals may have a configuration which is different from that illustrated in FIGS. 5 and 6. Specifically, the upper portion of the terminals may be U-shaped spring contacts with sides thereof which are in rows. Also, two element gas tube type surge arrestors may be employed rather than the three element devices illustrated and described above. In this instance, the terminals would be arranged closer together to accommodate the shorter gas tubes and would preferably be arranged in sets of three rather than in pairs. The upper portion of the middle one of each group of three terminals may be a double sided ribbon clip for contacting the end-ground electrodes of two different tubes. Alternatively, this middle terminal may have an elongated upper portion which is U-shaped for receiving the banded end electrodes of a pair of gas tubes. In another alternate structure, the housing 14 may be a one piece member in which ridges such as ridge 33E would be omitted. The compartments in this modified housing may be formed by plugs during molding of this part. In this instance, the compartments for the lower portions of the spring terminals would extend through the bottom wall of the housing. Spring terminals for this one piece housing would be similar to the ones shown in FIGS. 5 and 6, except that the maximum width of the upright portion thereof would be equal to that of the leg 52 and somewhat less than the full width of mating slots in the housing so that the terminals would pass through these slots. Such a modified ribbon contact 23A of a terminal 23, for example, would be pushed through the associated slot 33C until the arm 52 thereof was above the housing and the top edge 61 of the terminal contacted the inside surface of the associated opening 33. Dielectric plugs each having an opening for an associated pin of a connector 5 could then be secured with glue, for example, in the openings adjacent to folded finger contacts of the terminals to form the compartments. Also, one body half could be the portion of the housing to the right of the line B—B in FIG. 4 and containing all of the compartments, openings for the connector pins, slots for the central portions of the terminals, and elongated openings for the grounded pins on the connector 5. In this instance, the other portion of the housing could be an elongated dielectric bar. The scope of this invention is therefore to be determined from the attached claims rather than from the above detailed description of preferred embodiments thereof.

What is claimed is:

1. A pluggable connector holder receiving cylindrical gas tube surge arrestors having end electrodes and a cylindrical intermediate electrode, the holder being pluggable onto axially aligned and spaced apart pins of a connector for connecting tubes across associated terminals of a telephone repeater unit and associated telephone line cable pairs which are connected together at pins of the connector for protecting the repeater unit from surge voltages such as are induced by lightning onto a cable pair, comprising:

a plurality of electrically conductive spring terminals, each terminal having a first spring contact portion for making electrical connection with an end electrode of a surge arrestor tube and providing a spring type restraining force against the latter, and which is electrically connected through an arm portion to a second spring contact portion formed for receiving and making electrical connection with a pin of the connector; and an elongated electrically nonconductive housing having a plurality of axially aligned compartments formed therein, each compartment containing the second contact portion of an associated terminal and having an opening through one wall of said housing for passing an associated connector pin therethrough and into electrical contact with said second contact there when said housing is plugged onto pins of the connector, said first contact portions of said terminals protruding beyond another wall of said housing, adjacent pairs of terminals being oriented in said housing with said first contacts thereof for receiving a surge arrestor therebetween, for making electrical contact with the associated end electrodes of the surge arrestor, and for exerting a spring force on the latter to hold it in place.

2. The holder according to claim 1 including first means for electrically connecting the intermediate band electrode of each of said surge arrestors to a ground reference potential.

3. The holder according to claim 2 wherein said one wall is the bottom wall of said housing; said compartments, said first contacts, and said second contacts being arranged in associated rows that are in planes which are at least parallel to each other; each of said first contacts of said terminals extending above the top wall of said housing which is opposite said bottom wall thereof.

4. A pluggable holder according to claim 3 wherein said compartments are dimensioned to restrict movement of said second contacts therein along the axes of connector pins when the holder is plugged onto the pins; said housing being divided into a pair of body parts, one body part containing at least a portion of each of said compartments, the top wall of each compartment in at least said one body part having a slot therethrough for receiving said arm portion of an associated terminal; and means for joining said two body parts together to form a housing.

5. The pluggable holder according to claim 4 wherein said body parts are substantially identical and symmetrical about a center line therethrough, each body part containing a half of each compartment and having a slot in the top wall of the latter for receiving said central portion of an associated terminal.

6. The pluggable holder according to claim 5 including a plurality of ridges fixedly secured in said body half, one of said ridges being located above and extending above the slot in the top of each compartment and adjacent to a part of said first contact of an associated terminal to facilitate holding the latter in place.

7. The pluggable holder according to claim 5 wherein said first connecting means comprises an electrically conductive ground strap extending over the length of said holder and having a plurality of electrically conductive spring contact fingers extending from said strap, one of said fingers being located between terminals of each pair thereof with the free end of said finger being bent for contacting the intermediate electrode on a surge arrestor pressed between said first contacts of the associated terminals.

8. The pluggable holder according to claim 5 including at least a pair of standoff posts on said bottom wall of said housing for contacting and keeping the body of a connector a prescribed distance away from said bottom wall of said housing.

9. The pluggable holder according to claim 4 wherein said first contacts of said terminals are folded ribbon contacts.

10. The holder according to claim 9 wherein said second contacts of said terminals comprise folded finger contacts with the apex portions thereof located proximate said bottom wall of said housing.

* * * * *